(12) United States Patent
Manku

(10) Patent No.: US 9,958,533 B2
(45) Date of Patent: May 1, 2018

(54) METHOD AND SYSTEM FOR LOCATING WIRELESS DEVICES WITHIN A LOCAL REGION

(71) Applicant: DRNC HOLDINGS, INC., Wilmington, DE (US)

(72) Inventor: Tajinder Manku, Waterloo (CA)

(73) Assignee: DRNC Holdings, Inc., Wilmington, DE (US)

(*) Notice: Subject to any disclaimer, the term of this patent is extended or adjusted under 35 U.S.C. 154(b) by 692 days.

(21) Appl. No.: 14/186,298

(22) Filed: Feb. 21, 2014

(65) Prior Publication Data

US 2015/0070218 A1    Mar. 12, 2015

Related U.S. Application Data

(60) Provisional application No. 61/874,528, filed on Sep. 6, 2013.

(51) Int. Cl.
| | |
|---|---|
| *G01S 5/02* | (2010.01) |
| *G01S 13/76* | (2006.01) |
| *H04W 64/00* | (2009.01) |

(52) U.S. Cl.
CPC .......... *G01S 5/0289* (2013.01); *G01S 13/767* (2013.01); *H04W 64/006* (2013.01)

(58) Field of Classification Search
CPC ...... G01S 19/51; G01S 5/0289; G01S 5/0284; G01S 5/0242
See application file for complete search history.

(56) References Cited

U.S. PATENT DOCUMENTS

| | | | |
|---|---|---|---|
| 6,725,014 B1 | 4/2004 | Voegele | |
| 7,167,715 B2 * | 1/2007 | Stanforth | G01C 21/206 340/539.13 |
| 7,348,875 B2 * | 3/2008 | Hughes | G06K 19/0717 340/10.1 |
| 7,574,732 B2 | 8/2009 | Knox | |
| 7,742,773 B2 * | 6/2010 | Twitchell, Jr. | G01C 21/206 342/118 |
| 8,004,454 B2 | 8/2011 | Lindoff et al. | |

(Continued)

FOREIGN PATENT DOCUMENTS

| | | |
|---|---|---|
| EP | 2124348 | 11/2009 |
| EP | 2330538 | 6/2011 |

(Continued)

OTHER PUBLICATIONS

Violino, Bob. "The Basics of RFID Technology." RFID Journal. Jan. 2005. pp. 1-4.*

(Continued)

*Primary Examiner* — Gregory C. Issing
(74) *Attorney, Agent, or Firm* — Invention Mine LLC

(57) ABSTRACT

A method for locating wireless devices within a local region, comprising: determining respective global locations of two or more of the wireless devices; determining whether the wireless devices are within the local region by calculating respective distances between the global locations; determining respective ranges between the wireless devices within the local region; and, determining respective relative locations of the wireless devices within the local region by triangulation using the ranges.

18 Claims, 12 Drawing Sheets

(56) References Cited

U.S. PATENT DOCUMENTS

| | | | |
|---|---|---|---|
| 8,150,421 B2 | 4/2012 | Ward et al. | |
| 8,334,801 B2 | 12/2012 | Fretenburg | |
| 8,559,554 B2 | 10/2013 | Vossiek | |
| 2002/0008615 A1 | 1/2002 | Heide | |
| 2002/0063622 A1 | 5/2002 | Armstrong | |
| 2004/0033808 A1* | 2/2004 | Rorabaugh | G01S 5/0289 455/456.1 |
| 2005/0012653 A1 | 1/2005 | Heide | |
| 2005/0099333 A1 | 5/2005 | Gila | |
| 2007/0103303 A1 | 5/2007 | Shoarinejad | |
| 2008/0176583 A1* | 7/2008 | Brachet | G01S 5/0236 455/456.3 |
| 2008/0309550 A1* | 12/2008 | Sairo | G01S 5/0027 342/357.27 |
| 2009/0160711 A1* | 6/2009 | Mehta | G01S 5/0205 342/450 |
| 2009/0195360 A1* | 8/2009 | Jeon | H04B 5/0062 340/10.1 |
| 2009/0303005 A1 | 12/2009 | Tuttle | |
| 2009/0309780 A1 | 12/2009 | Albert | |
| 2010/0141398 A1* | 6/2010 | Borovoy | G08B 1/08 340/10.6 |
| 2010/0302005 A1 | 12/2010 | Popovski | |
| 2011/0006942 A1 | 1/2011 | Kluge | |
| 2011/0109440 A1 | 5/2011 | Muehlmann | |
| 2011/0234445 A1 | 9/2011 | Patrick | |
| 2011/0304497 A1 | 12/2011 | Molyneux | |
| 2012/0052884 A1* | 3/2012 | Bogatin | G01S 5/0284 455/456.6 |
| 2012/0112959 A1* | 5/2012 | Richard | G01S 5/0072 342/357.31 |
| 2013/0178231 A1* | 7/2013 | Morgan | G01S 5/0278 455/456.1 |
| 2013/0187761 A1 | 7/2013 | Shoarinejad | |
| 2013/0201003 A1 | 8/2013 | Sabesan | |
| 2013/0281120 A1* | 10/2013 | Oka | H04W 64/00 455/456.2 |
| 2013/0300619 A1 | 11/2013 | Manku | |
| 2014/0016719 A1 | 1/2014 | Manku | |
| 2014/0128707 A1 | 5/2014 | Bakker | |
| 2014/0184447 A1 | 7/2014 | Zhou | |
| 2014/0211691 A1* | 7/2014 | Emadzadeh | H04W 64/00 370/328 |

FOREIGN PATENT DOCUMENTS

| | | | |
|---|---|---|---|
| JP | 2000019246 | 1/2000 | |
| JP | 2001021644 | 1/2001 | |
| JP | 2005017112 | 1/2005 | |
| WO | 0214897 A2 | 2/2002 | |
| WO | WO 2010129589 A1 * | 11/2010 | G01S 5/0284 |

OTHER PUBLICATIONS

International Searching Authority (ISA/CA), International Search Report and Written Opinion, dated Jun. 13, 2014, for corresponding International Patent Application No. PCT/CA2014/000150.

Viikari, V., et al., "Ranging of UHF RFID Tag Using Stepped Frequency Read-Out," in IEEE Sensors Jounal, vol. 10, No. 9, pp. 1535-1539, Sep. 2010.

International Searching Authority (ISA/CA), International Search Report and Written Opinion, dated May 13, 2014, for corresponding International Patent Application No. PCT/CA2014/000151.

D. Arnitz, et. al. "Multifrequency Continuous-Wave Radar Approach to Ranging in Passive UHF RFID". IEEE Transactions on Microwave Theory and Techniques, vol. 57, No. 5, May 2009, 8 pages.

* cited by examiner

METHOD AND SYSTEM FOR LOCATING WIRELESS DEVICES WITHIN A LOCAL REGION

This application claims priority from U.S. Provisional Patent Application No. 61/874,528, filed Sep. 6, 2013, and incorporated herein by reference.

FIELD OF THE INVENTION

This invention relates to the field of locating systems, and more specifically, to a method and system for locating objects within a local region.

BACKGROUND OF THE INVENTION

Radio frequency identification ("RFID") systems have become very popular in a great number of applications. A typical RFID system 100 is shown in FIG. 1. The RFID system 100 includes an application system 110, a reader 120, and a tag 130. When the tag 130 appears in the operational range of the reader 120, it starts receiving both energy 140 and data 150 via its antenna 133 from the reader 120 via its transmitter/receiver 121 and antenna 123. A rectify circuit 131 in the tag 130 collects and stores the energy 140 for powering the other circuits (e.g., control/modulator 132) in the tag 130. After collecting enough energy 140, the tag 130 may operate and send back pre-stored data to the reader 120. The reader 120 then passes the received response data via a communications interface 160 to the server system/database 111 of the application system 110 for system applications.

The tags 130 in RFID system 100 may be classified into passive and active types according to the power provisions of the tags. Passive tags do not have their own power supply and therefore draw all power required from the reader 120 by electromagnetic energy received via the tag's antenna 133. In contrast, active tags incorporate a battery which supplies all or part of the power required for their operation.

A typical transmission method of energy 140 and data 150 between a reader 120 and a tag 130 in a RFID system 100 is by way of backscatter coupling (or backscattering). The antenna 123 of the reader 120 couples energy 140 to the tag 130. By modulating the reflection coefficient of the tag's antenna 133, data 150 may be transmitted between the tag 130 and the reader 120. Backscattering, as shown in FIG. 2, is typically used in microwave band RFID systems. Power $P_{in}$ 210 is emitted from the reader's antenna 123. A small proportion of $P_{in}$ 210 is received by the tag's antenna 133 and is rectified to charge the storing capacitor in the tag 130 for serving as a power supply. After gathering enough energy, the tag 130 begins operating. A portion of the incoming power $P_{in}$ 210 is reflected by the tag's antenna 133 and returned as power $P_{return}$ 220. The reflection characteristics may be influenced by altering the load connected to the antenna 133. In order to transmit data 150 from the tag 130 to the reader 120, for example, a transistor may be switched on and off in time with the transmitted data stream. The magnitude of the reflected power $P_{return}$ 220 may thus be modulated and picked up by the reader's antenna 123.

One problem with existing RFID systems is that they have limited capability with respect to long distance ranging or locating, that is, determining the range or location of a tag, object, or wireless device that is located a long distance from the reader. While the range of local devices may be determined with existing RFID systems, problems remain with respect to determining how many devices are local and their relative locations with respect to other devices.

The positioning or locating of devices is currently performed on a global basis using either global positioning system ("GPS")-based and/or WiFi-based locating methods. This information is shared with mobile applications for various reasons (e.g., localized advertising, finding local businesses, mapping, sharing location between users, etc.). However, using a wireless device to find the local relative location (e.g., less than 20 meters) of another wireless device, other stationary devices, objects, or tags within centimeters via an RFID system and/or other wireless methods has not been adequately addressed. While indoor positioning of devices within a local region has been attempted using Bluetooth™ 4.0, such an application requires changes to the Bluetooth™ standard and the need for a base-station mounted on the ceiling of the building in view of the devices to be located.

A need therefore exists for an improved method and system for locating objects within a local region. Accordingly, a solution that addresses, at least in part, the above and other shortcomings is desired.

SUMMARY OF THE INVENTION

According to one aspect of the invention, there is provided a method for locating wireless devices within a local region, comprising: determining respective global locations of two or more of the wireless devices; determining whether the wireless devices are within the local region by calculating respective distances between the global locations; determining respective ranges between the wireless devices within the local region; and, determining respective relative locations of the wireless devices within the local region by triangulation using the ranges.

In accordance with further aspects of the invention there is provided an apparatus such as a data processing system, a method for adapting same, as well as articles of manufacture such as a computer readable medium or product and a computer program product or software product (e.g., comprising a non-transitory medium) having program instructions recorded or stored thereon for practising the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXEMPLARY EMBODIMENTS

In the following description, details are set forth to provide an understanding of the invention. In some instances, certain software, circuits, structures, techniques and methods have not been described or shown in detail in order not to obscure the invention. The term "data processing system" is used herein to refer to any machine for processing data, including the computer systems, servers, wireless devices, radio frequency identification ("RFID") systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
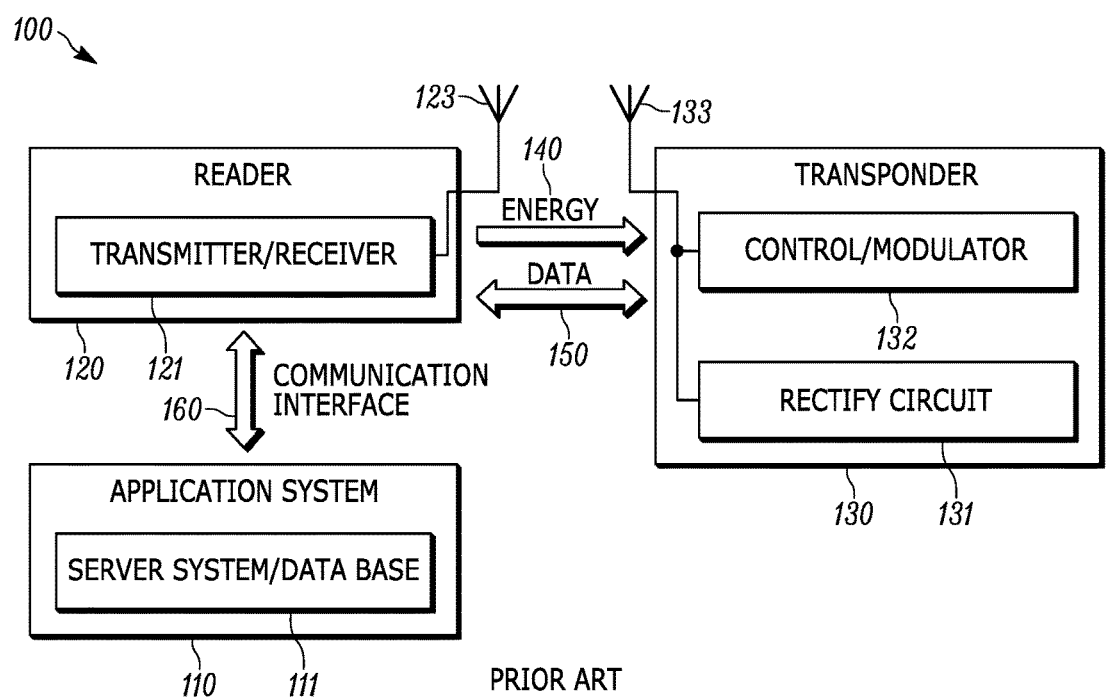
FIG. 1 is a block diagram illustrating a radio frequency identification (RFID) system in accordance with the prior art.
Figure 2:
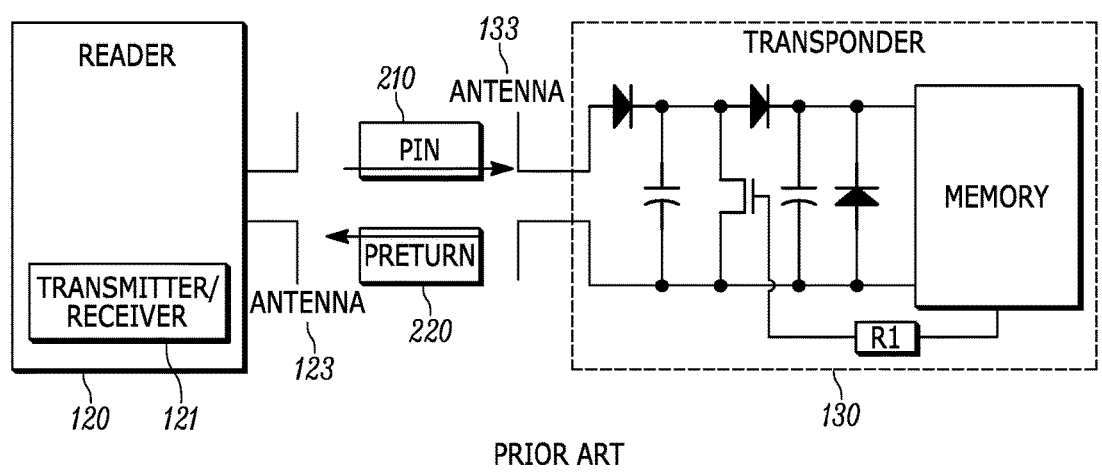
FIG. 2 is a block diagram illustrating transmission of energy and data between a reader and a tag in a RFID system in accordance with the prior art.
Figure 3:
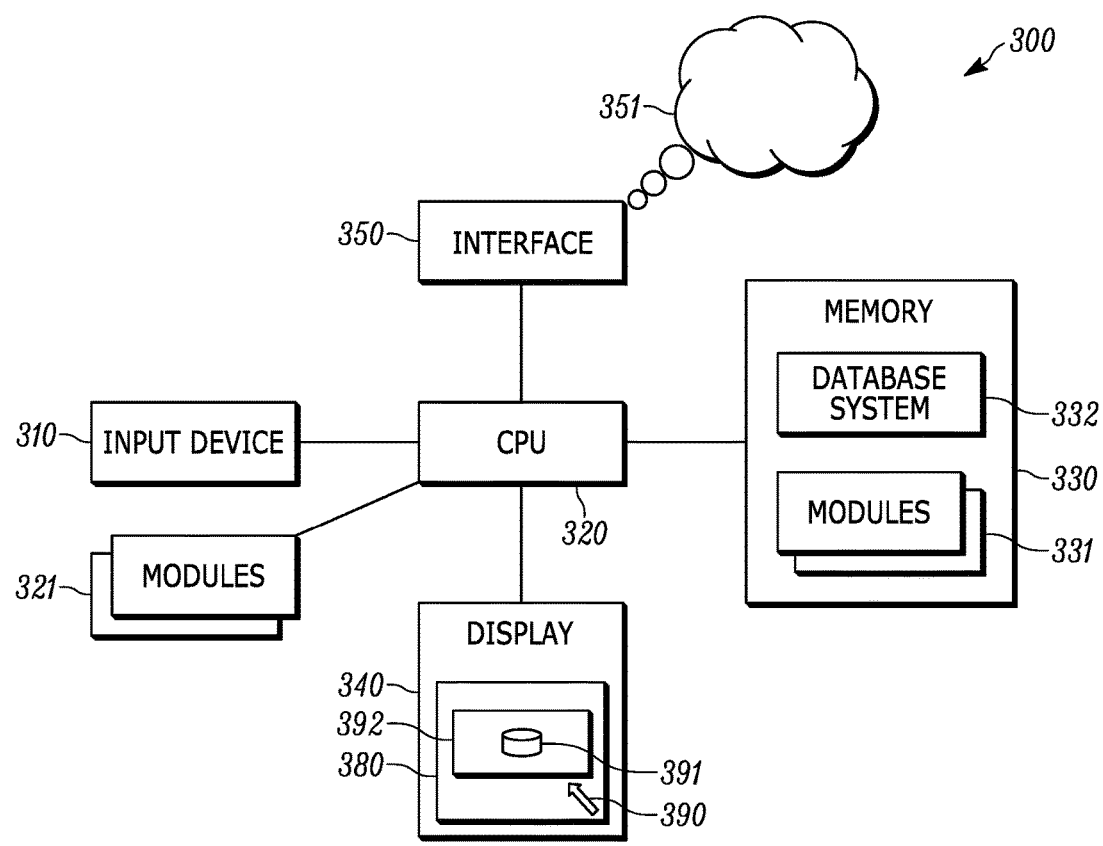
FIG. 3 is a block diagram illustrating a data processing system in accordance with an embodiment of the invention.

FIG. 3 is a block diagram illustrating a data processing system 300 in accordance with an embodiment of the invention. The data processing system 300 is suitable for use in a locating system 400 as a server 407 and/or wireless device 440 or in a RFID system 100 as a reader 120 and/or tag 130. The data processing system 300 is also suitable for generating, displaying, and adjusting presentations in conjunction with a graphical user interface ("GUI"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. In addition, the data processing system 300 may include a Global Positioning System ("GPS") receiver or other type of positioning system or device. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a memory stick, a compact disk ("CD"), etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 4:
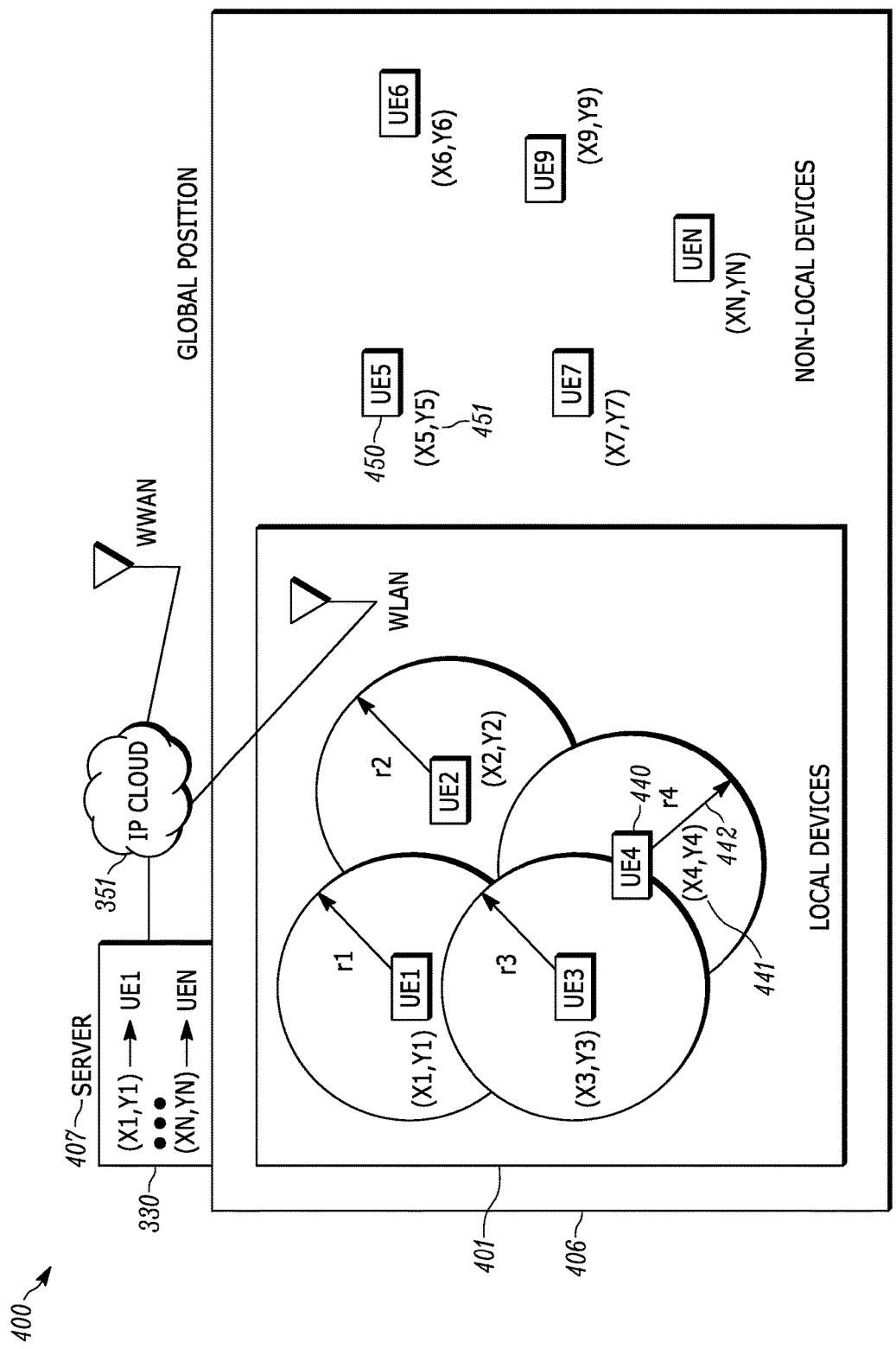
FIG. 4 is a block diagram illustrating a system for locating wireless devices within a local region in accordance with an embodiment of the invention.

FIG. 4 is a block diagram illustrating a system 400 for locating wireless devices (e.g., 440) within a local region 401 in accordance with an embodiment of the invention. The system 400 includes one or more local wireless devices 440 and one or more non-local wireless devices 450. The system 400 also includes a server 407 communicatively coupled to the wireless devices 440, 450 over a network 351 such as an Internet Protocol ("IP") cloud including a wireless wide area network ("WWAN") and/or a wireless local area network ("WLAN"). Local wireless devices 440 are devices that are located within a local region 401 having a radius of less than 20 meters, for example, or within a given in-door environment such as a conference room, a social environment (e.g., a bar, a restaurant, etc.), a meeting room, a local region of a shopping mall, or in a house. Non-local wireless devices 450 are devices that are located in a non-local region 406 beyond or outside of the local region 401. According to one embodiment, each of the server 407 and the wireless devices 440, 450 may include or have a configuration similar to that of the data processing system 300.

According to one embodiment of the invention, first, the global location 441 of each wireless device 440 is determined. Second, which wireless devices 440 are located in the local region 401 is determined from the global locations 441. Third, the relative location 444 of each wireless device 440 with respect to each other wireless device within the local region 401 is determined using RFID methods.

Referring again to FIG. 4, a GPS-based or WiFi-based method or system or other type of positioning system or device provides the global location of the wireless devices 440, 450. The local wireless devices 440 shown in FIG. 4 are denoted UE1, UE2, UE3, and UE4, where "UE" means "user equipment". The other devices (i.e., non-local wireless devices 450 denoted UE5 to UEn) shown in FIG. 4 are not located within the local region 401 and are identified or located by either GPS-based or WiFi-based methods. The respective global location 441, 451 of each wireless device 440, 450 may be denoted by x and y coordinates (e.g., (x1, y1), (x2, y2), ... (xn, yn)) as shown in FIG. 4. The respective absolute error in the global location of each local wireless device 440 as determined by GPS-based or WiFi-based methods may be denoted by a radius (e.g., r1, r2, r3, and r4) 442 as shown in FIG. 4. These errors 442 may be in the tens of meters. The global locations 441, 451 of the wireless devices 440, 450 as determined via GPS-based or WiFi-based methods are stored in the memory 330 of the server 407 which may be communicatively coupled to the wireless devices 440, 450 via either cellular or WiFi communications.

The server 407 determines which wireless devices 440 are located in the local region 401 by considering the global location 441 of the wireless devices 440 and correlating these within a relative distance less a predetermined radius. For example, the server 407 may determine whether all of the wireless devices 440 are within a 20 meter radius (or 100 meter radius, etc.). This may be done, for example, by calculating vector differences (e.g., (x1, y1)−(x2, y2), etc.) or distances between the global locations 441 of the wireless devices 440.

Figure 5:
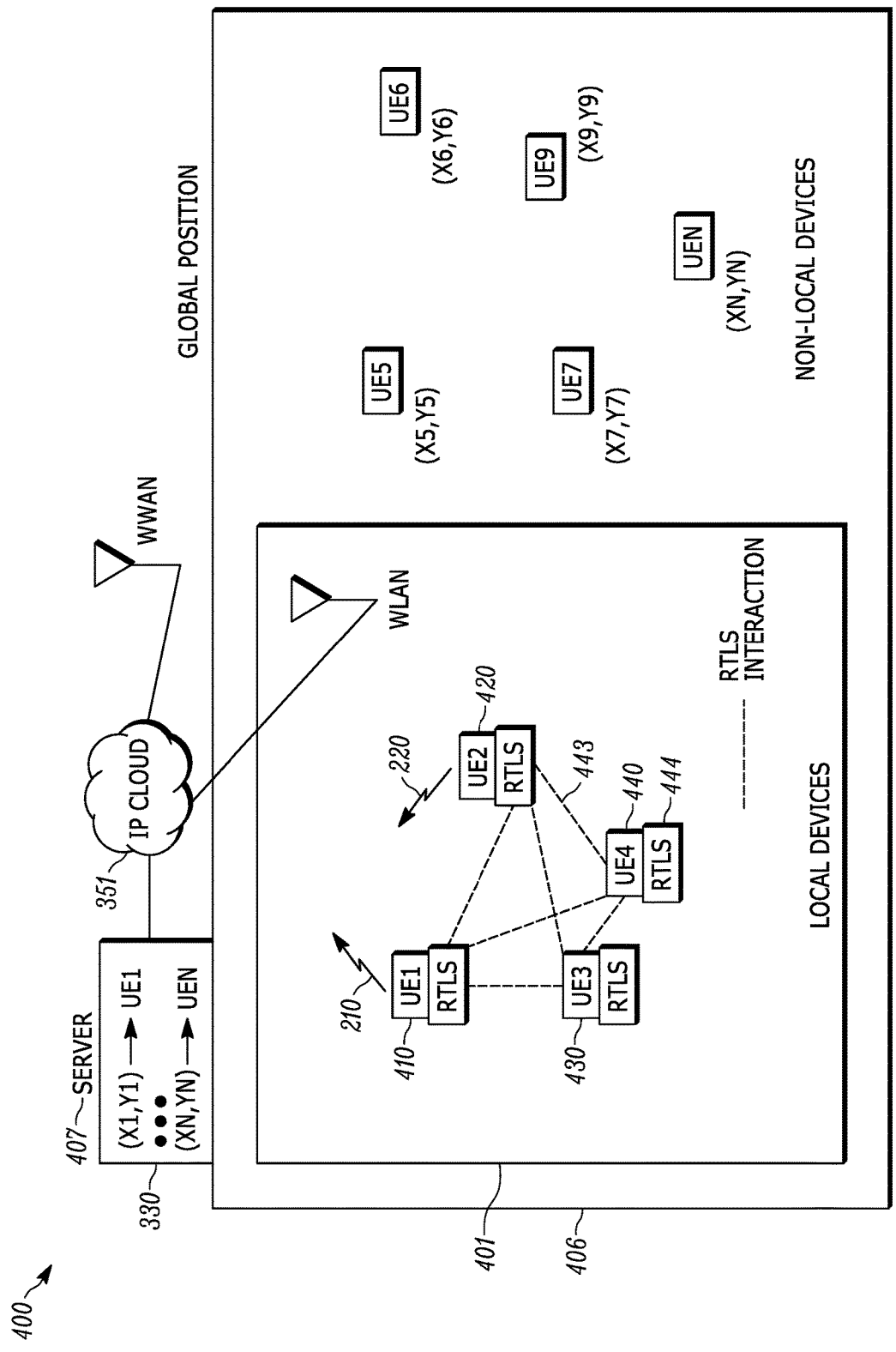
FIG. 5 is a block diagram illustrating the use of RFID methods to determine the relative location of local wireless devices with respect to each other, in accordance with an embodiment of the invention.

FIG. 5 is a block diagram illustrating the use of RFID methods to determine the relative location 444 of local wireless devices 440 with respect to each other, in accordance with an embodiment of the invention. FIG. 5 shows which wireless devices 440 are local to each other and how measurement of their relative locations 444 using RFID methods or RFID real-time locating methods is performed. With respect to the use of RFID methods, which wireless device (e.g., 410) is to be considered as the detector and which wireless device (e.g., 420) is to be considered as the tag may be controlled or configured via the server 407 and may be communicated back to the respective wireless devices 410, 420, for example, via either cellular or WiFi communications. For example, if a first local wireless device 410 (UE1) is initially designated as the detector, then it will send out an original signal 210 to all the other local wireless devices 420, 430, 440 (UE2, UE3, UE4) accordingly. The other local wireless devices 420, 430, 440 backscatter modulated signals 220 back to the first local wireless device 410. The modulated signals 220 may include information such as wireless device properties, identifications, etc. The range 443 of all of the local wireless devices 410, 420, 430, 440 may then be determined by the first local wireless device 410. This information may then be sent to the server 407. Next a second wireless device 420 (UE2) is designated as the detector device and the range 443 of all the other wireless devices 410, 430, 440 may then be determined by the second wireless device 420 (UE2). This information may again be sent to the server 407. This process may continue for all the other wireless devices 430, 440 or for only a predetermined or fixed number of wireless devices (e.g., 430 alone, etc.). Using triangulation, the relative location 444 of all the wireless devices 410, 420, 430, 440 may then be determined by the server 407 from the range 443 information. Methods for determining relative locations 444 other than by triangulation may also be used. This relative location 444 information may then be sent to selected or all of the wireless devices 410, 420, 430, 440. Note that the location detection or determination is denoted by broken lines labelled "RTLS" (i.e., real-time locating system or real-time location service) in FIG. 5.

Figure 6:
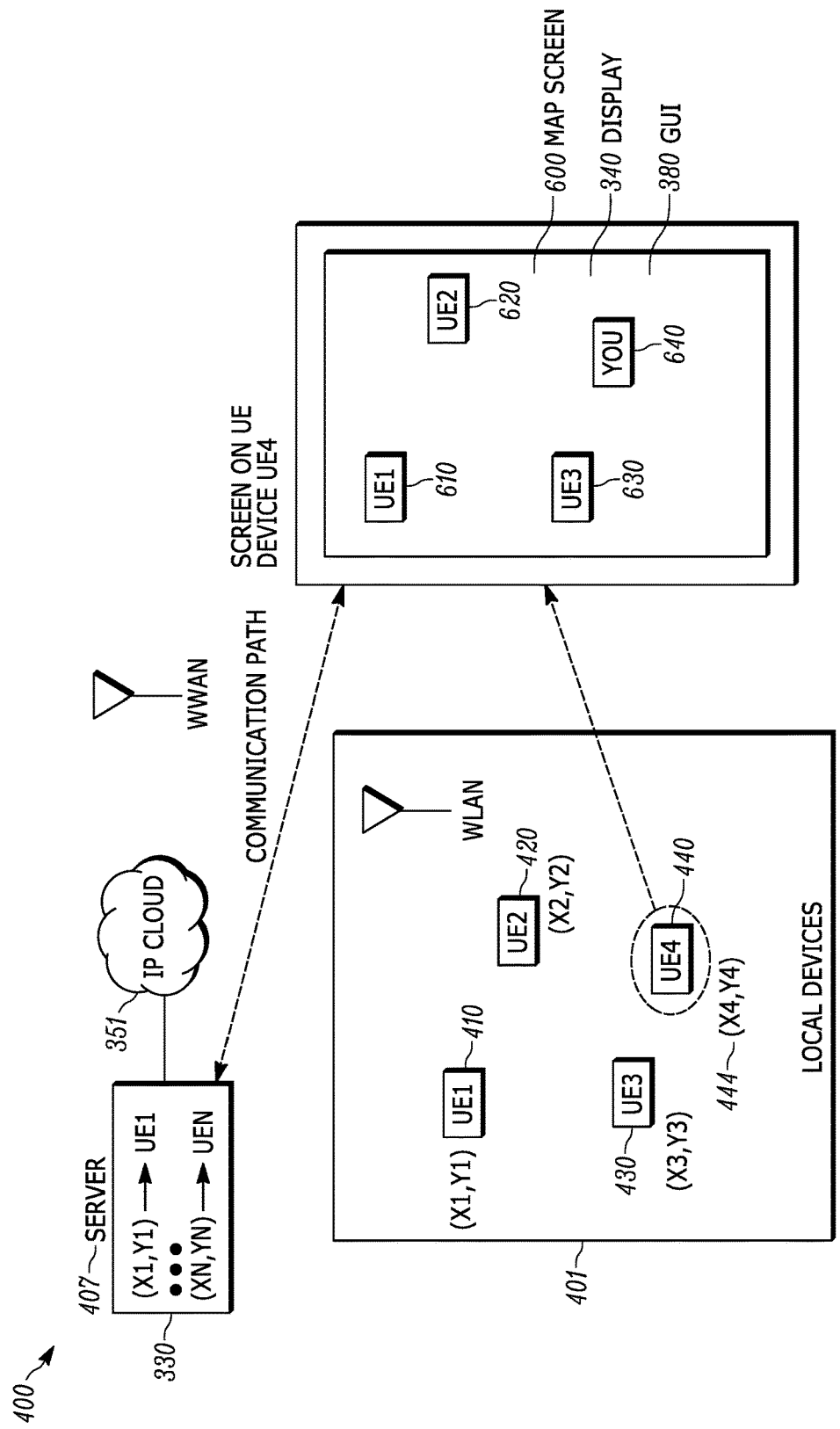
FIG. 6 is a block diagram illustrating an application or module running on a wireless device and an associated screen capture illustrating a map screen, in accordance with an embodiment of the invention.

FIG. 6 is a block diagram illustrating an application or module (e.g., 331) running on a wireless device (e.g., 440) and an associated screen capture illustrating a map screen 600, in accordance with an embodiment of the invention. On the left side of FIG. 6, the relative locations 444 of the wireless devices 410, 420, 430, 440 (UE1 to UE4) in the local region 401 are shown. On the right side of FIG. 6, a screen capture is shown which includes a map screen 600. The map screen 600 may be displayed on the display 340 of a wireless device 440 (UE4) by the application 331 via the wireless device's GUI 380 and related modules 331. The map screen 600 includes a pictorial illustration, representation, or map showing the relative location 444 of each of the wireless devices 410, 420, 430, 440. Each wireless device 410, 420, 430, 440 may be represented by a respective icon 610, 620, 630, 640 on the map screen 600. The icon 640 used to represent the user's wireless device 440 on the map screen 600 may indicate such to the user, for example, by using a different shape and/or text (e.g., "YOU").

Figure 7:
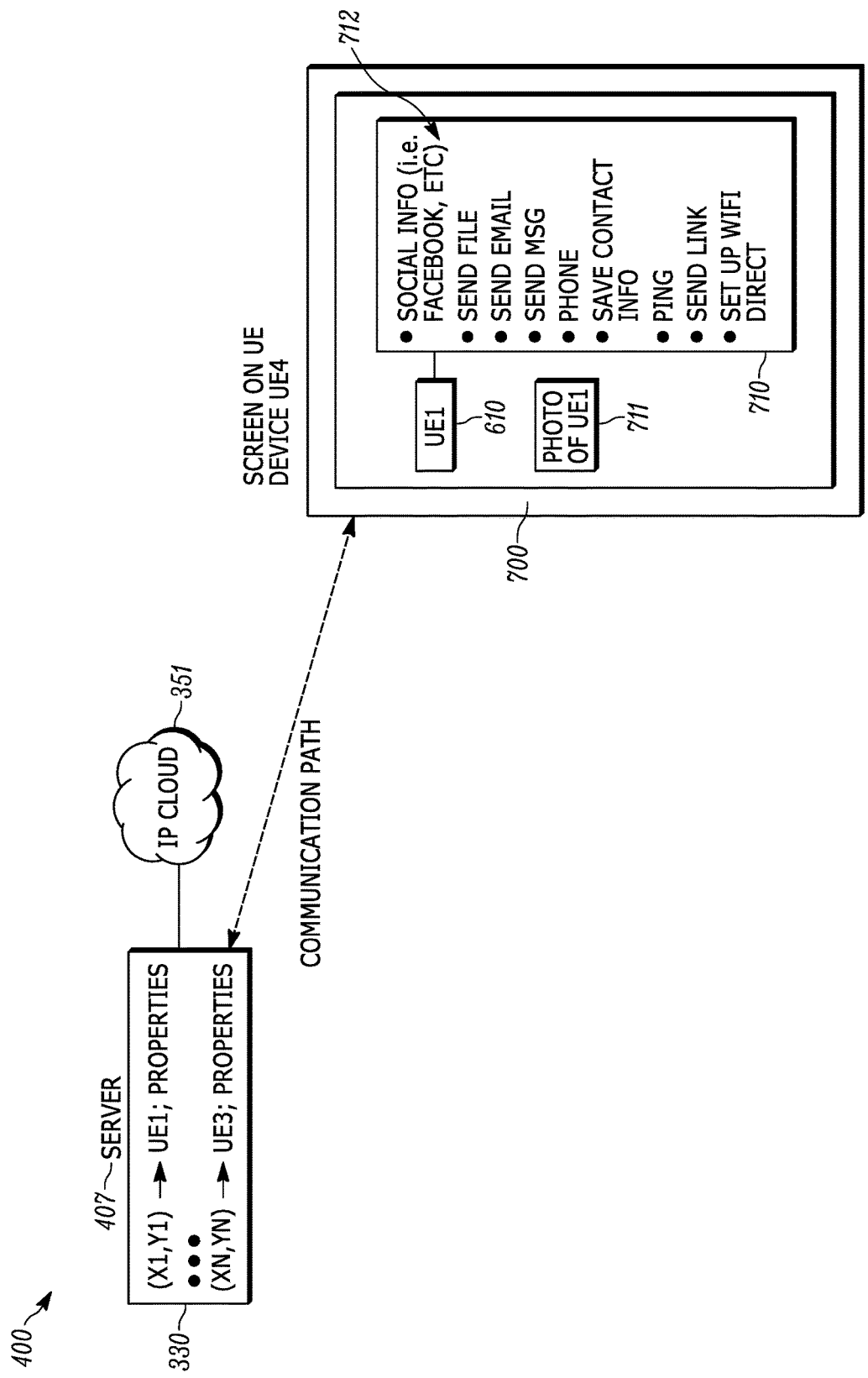
FIG. 7 is a block diagram illustrating an application or module running on a wireless device an associated screen capture illustrating a properties screen, in accordance with an embodiment of the invention.

FIG. 7 is a block diagram illustrating an application or module (e.g., 331) running on a wireless device (e.g., 440) and an associated screen capture illustrating a properties screen 700, in accordance with an embodiment of the invention. If the user of the wireless device 440 selects one of the wireless devices 410, 420, 430, 440 by either touching or clicking on the wireless device's icon 610, 620, 630, 640 on the map screen 600, for example, various properties 710 relating to the selected wireless device (e.g., 410) may be displayed on a properties screen 700 as shown in FIG. 7. The properties 710 of the various wireless devices 410, 420, 430, 440 may be transmitted over the network 351 (and/or by RFID methods) and stored in the memory 330 of the server 401 to support various applications and interactions. In FIG. 7, the user of the fourth wireless device 440 has selected the icon 610 representing the first wireless device 410 and hence the properties 710 relating to the first wireless device 410 are presented or highlighted on the display 340 of the fourth wireless device 440. These properties 710 may include a picture, photograph, representation, or image 711 of the person or object associated with the first wireless device 410. Also, various actions 712 associated with the first wireless device 410 may be presented. These actions 712 may include, for example, social information, sending an email, sending a text, saving contact information, pinging the selected wireless device (e.g., 410), setting up a WiFi direct link, or setting up a Bluetooth™ link. If the wireless device 410 is not associated with a person, the displayed properties, images, and actions 710, 711, 712 may be different or adjusted accordingly. Some properties 710 may be determined by the settings of the wireless device 410. For example, access to the "Send msg" or send message action by the surrounding wireless devices 420, 430, 440 may not be allowed by the selected wireless device 410.

Figure 8:
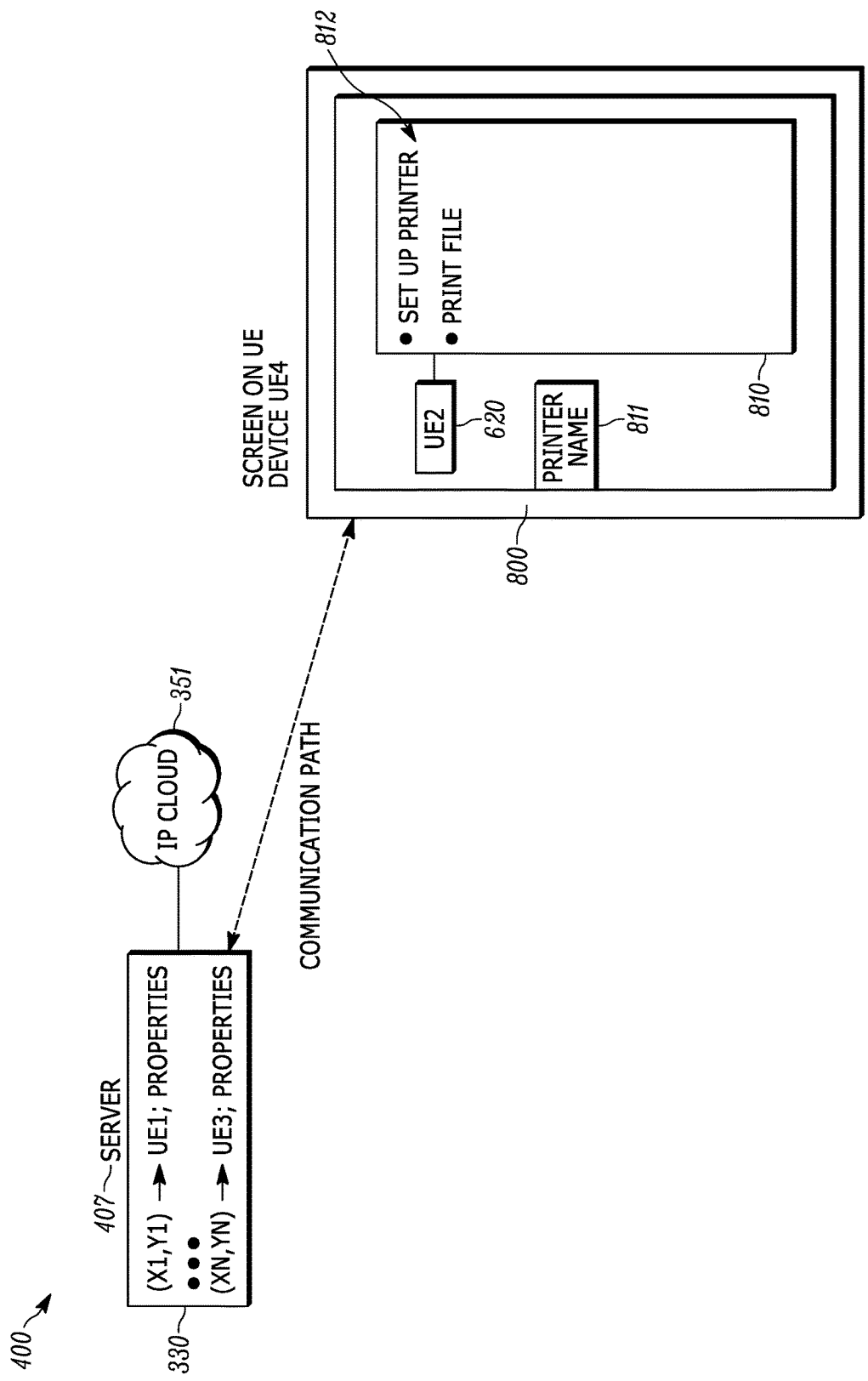
FIG. 8 is a block diagram illustrating an application or module running on a wireless device and an associated screen capture illustrating an alternate properties screen, in accordance with an embodiment of the invention.

FIG. 8 is a block diagram illustrating an application or module (e.g., 331) running on a wireless device (e.g., 440) and an associated screen capture illustrating an alternate properties screen 800, in accordance with an embodiment of the invention. In FIG. 8, the user of the fourth wireless device 440 has selected the icon 620 representing the second wireless device 420 (UE2). In this example, the second wireless device 420 is a printer. As such, the properties 810 differ from those 710 included in the properties screen 700 for the first wireless device 410 as shown in FIG. 7 and may include actions 812 such as setting up the printer and printing a file. The printer name 811 or an image of the printer may also be included on the properties screen 800.

Figure 9:
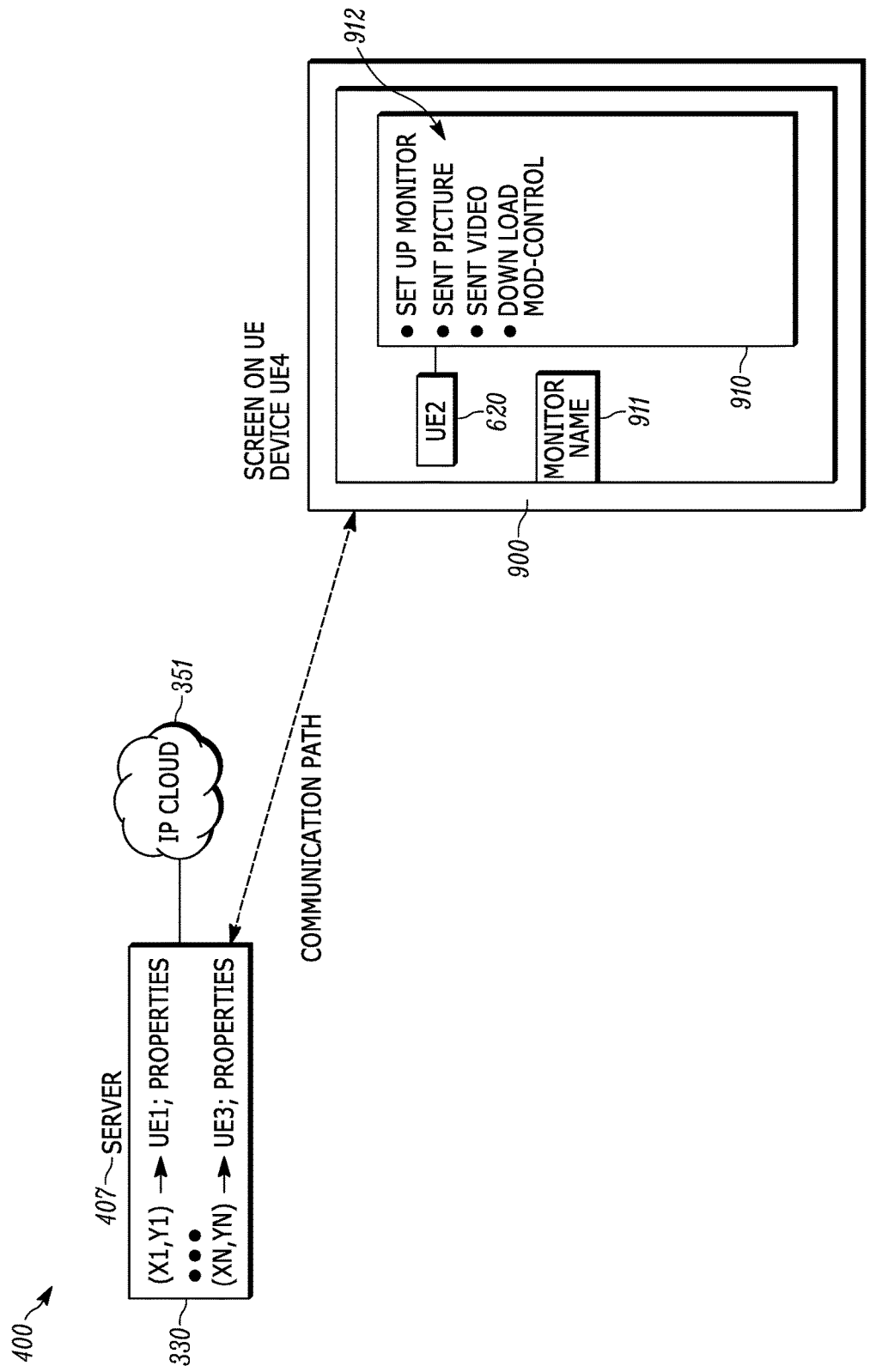
FIG. 9 is a block diagram illustrating an application or module running on a wireless device and an associated screen capture illustrating another alternate properties screen, in accordance with an embodiment of the invention.

FIG. 9 is a block diagram illustrating an application or module (e.g., 331) running on a wireless device (e.g., 440) and an associated screen capture illustrating another alternate properties screen 900, in accordance with an embodiment of the invention. In FIG. 9, the user of the fourth wireless device 440 has selected the icon 620 representing the second wireless device 420 (UE2). In this example, the second wireless device 420 is a display or monitor. As such, the properties 910 differ from those 710 included in the properties screen 700 for the first wireless device 410 as shown in FIG. 7 and may include actions 912 such as setting up the monitor, sending a picture or image, sending a video, and downloading remote control settings. The monitor printer name 911 or an image of the monitor may also be included on the properties screen 900.

Figure 10:
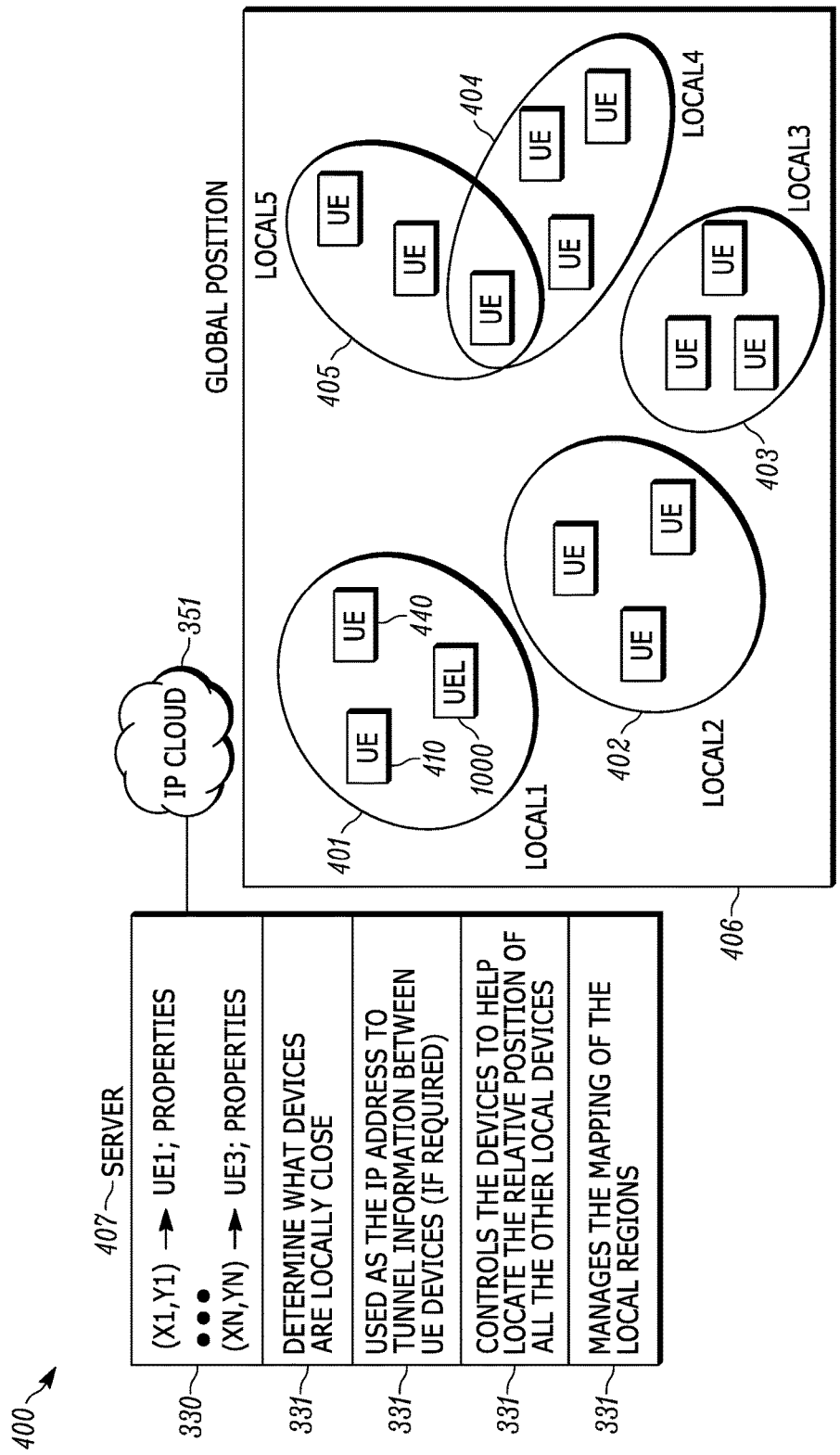
FIG. 10 is a block diagram illustrating a system for locating wireless devices within one or more local regions in accordance with an embodiment of the invention.

FIG. 10 is a block diagram illustrating a system 400 for locating wireless devices 440 within one or more local regions 401, 402, 403, 404, 405 in accordance with an embodiment of the invention. FIG. 10 shows a global view of several local regions 401, 402, 403, 404, 405 and several wireless devices (e.g., 440). In addition, FIG. 10 shows the various properties stored in the memory 330 of the server 407 for the several local regions 401, 402, 403, 404, 405 or subsets of the wireless devices 440. For example, local region "local1" 401 has three wireless devices 410, 440, 1000 labelled as UE, UE, and UEL. One of the wireless devices 1000 (UEL), shown as being located in the first local region 401 (local1) in FIG. 10, may be a fixed position device configured to store information relating to the relative mapping of the local region 401. Exact co-ordinates pertaining to this wireless device 1000 (UEL), which may be obtained from an on-board GPS receiver for example, may be sent to the server 407 to assist in computing the location of the other wireless devices 410, 440. Again, information pertaining to selected or all the local regions 401, 402, 403, 404, 405 and their local wireless devices 410, 440, 1000 may be stored in the server 407. The server 407 is used to determine the global location 441 of the wireless devices 440 and also their relative locations 444 within each local region 401 or subset. The server 407 may include modules 331 for tunneling information between the wireless devices 440, if desired. In addition, the server 407 may control the wireless devices 440 to assist in locating or computing the relative location 444 of all the other local wireless devices 440. Furthermore, the server 401 may manage mapping information relating to the local regions 401, 402, 403, 404, 405.

Figure 11:
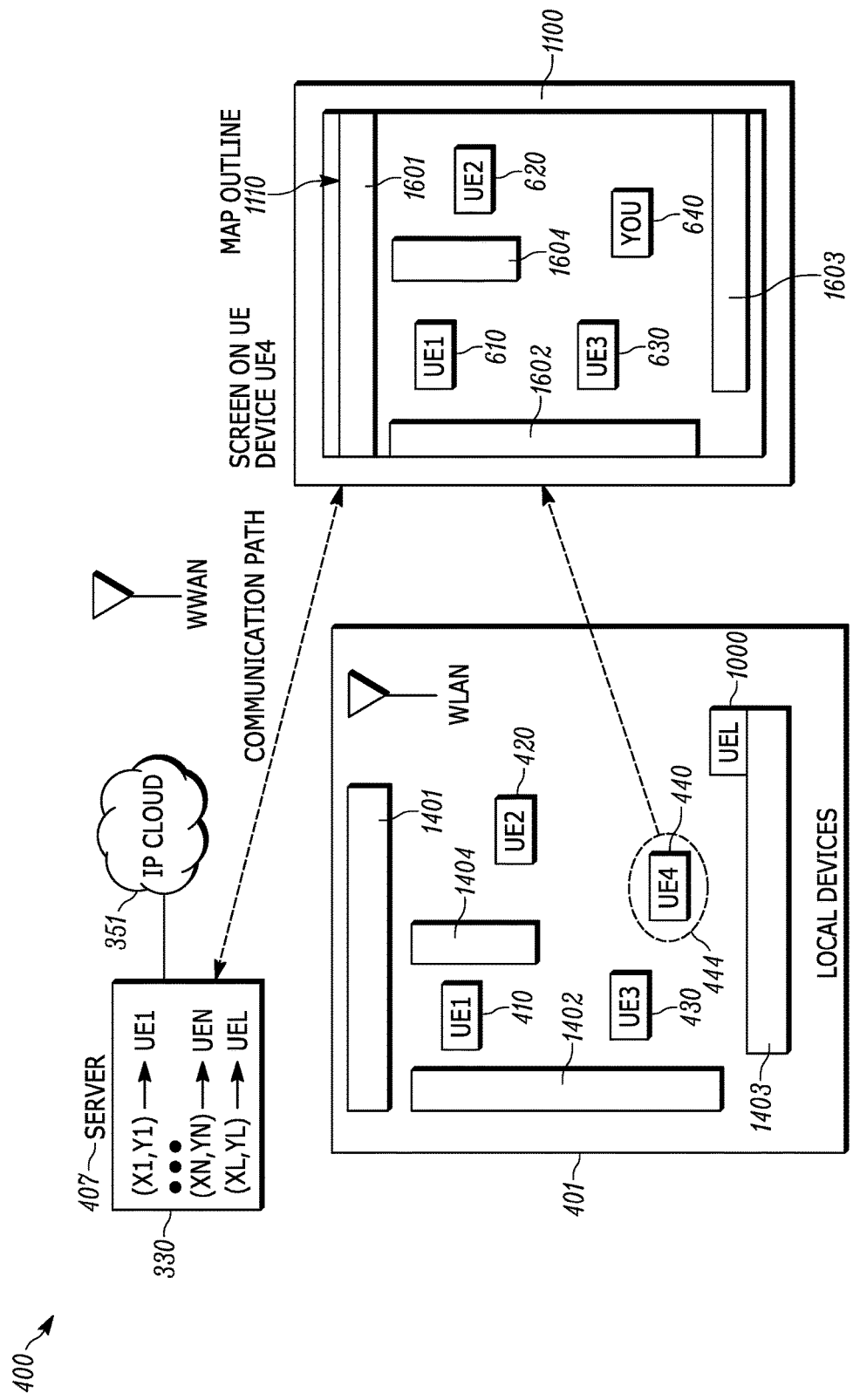
FIG. 11 is a block diagram illustrating an application or module running on a wireless device and an associated screen capture illustrating an alternate map screen, in accordance with an embodiment of the invention; and, FIG. 12 is a flow chart illustrating operations of modules within a data processing system for locating wireless devices within a local region, in accordance with an embodiment of the invention.

FIG. 11 is a block diagram illustrating an application or module (e.g., 331) running on a wireless device (e.g., 440) and an associated screen capture illustrating an alternate map screen 1100, in accordance with an embodiment of the invention. On the left side of FIG. 11, the relative locations 444 of the wireless devices 410, 420, 430, 440 (UE1 to UE4) are shown. The large rectangular blocks represent walls 1401, 1402, 1403, 1404. The wireless devices 410, 420, 430, 440 (UE1 to UE4) are particular devices that may be associated with individuals, printers, monitors, or other devices. Mapping information may be stored in a wireless device or RFID tag 1000 labeled UEL in FIG. 11. The fixed wireless device 1000 either defines or points to mapping information. There may be several fixed wireless devices 1000 in a given local region 401. Note that only one fixed wireless device 1000 is shown in FIG. 11. The fixed wireless device 1000 may be either a passive or active RFID tag device. On the right side of FIG. 11, a screen capture is shown which includes a map screen 1100. As in FIG. 6, the map screen 1100 includes a pictorial illustration, representation, or map showing the relative location 444 of each of the wireless devices 410, 420, 430, 440. Each wireless device 410, 420, 430, 440 may be represented by a respective icon 610, 620, 630, 640 on the map screen 600. The icon 640 used to represent the user's wireless device 440 on the may screen 600 may indicate such to the user, for example, by using a different shape and/or text (e.g., "YOU"). In addition, the map screen 1100 may include a map outline 1110 which in turn may include a respective icon 1601, 1602, 1603, 1604 for each of the walls 1401, 1402, 1403, 1404 appearing in the local region 401. Note that an icon for the fixed wireless device 1000 is not shown on the map screen 1100 as it is generally not required to be shown to a user. Of course, an icon for the fixed wireless device 1000 may be shown optionally.

According to one embodiment of the invention, the operations of the server 407 described above may be incorporated in one of the wireless devices (e.g., 440). In such an embodiment, a server 407 would not be required. For example, in such an embodiment, the wireless device 440 would determine the relative locations 444 of the local devices 410, 420, 430 around it by communicating with them via RFID methods, that is, the information stored within each wireless device (e.g., 410) may be transmitted to the other wireless devices (e.g., 420, 430, 440) using RFID communication methods (e.g., backscattered information). The wireless devices 410, 420, 430, 440 may also communicate using cellular or WiFi communications.

According to one embodiment of the invention, the system 400 may use radar-based RFID methods for locating wireless devices 410, 420, 430, 440. In this embodiment, one or more of the wireless devices 410, 420, 430, 440 includes a radar detecting device, reader, or system and one or more of the wireless devices 410, 420, 430, 440 includes or acts as a backscattering wireless device, object or tag. The radar-based RFID method used may employ relative power measurements to determine the ranges 443 of the wireless devices 410, 420, 430, 440. In operation, a first wireless device (e.g., 410) may reflect back or backscatter a unique frequency offset signal to a detecting system in a second wireless device (e.g., 420). In addition, the wireless device 410 may backscatter an identification ("ID") signature (e.g., a controlled offset frequency). By using methods such as power measurement, etc., the range 443 of the backscattering wireless device 410 may then be determined by the detecting system in the second wireless device 420. In terms of power measurement, the power returned $P_r$ to the detecting receiver antenna of the detecting system in the second wireless device 420 is given by the equation:

$$P_r = \frac{P_t G_t A_r \sigma F^4}{(4\pi)^2 R^4}$$

where $P_t$ is the transmitting power of the detecting system's transmitter, $G_t$ is the gain of the detecting system's transmitting antenna, $A_r$ is the effective aperture of the receiver antenna of the first wireless device 410, $\sigma$ is the radar cross section, F is the pattern propagation, and R is the range 443 or distance between the first wireless device 410 and the second wireless device 420. Triangulation, for example, may then be used to determine the relative locations 444. Of course, the relative location 444 of the wireless devices 410, 420, 430, 440 may be determined using other radar-based methods known to those of skill in the art.

According to one embodiment, the first wireless device 410 transmits an original signal (e.g., 210) and the second wireless device 420, in response to the original signal 210, backscatters a modulated signal (e.g., 220) that is a frequency offset version of the original signal 210. Backscattering of a frequency offset modulated signal 220 is described, for example, in United States Patent Application Publication No. US 2014/0016719 A1, published Jan. 16, 2014, and incorporated herein by reference.

The above embodiments may contribute to an improved method and system 400 for locating wireless devices (e.g., 440) within a local region 401 and may provide one or more advantages. First, the present invention enables a local wireless device 440 to map out wireless devices 410, 420, 430 located around it and to display the relative locations 444 of the wireless devices 410, 420, 430, 440. Second, the present invention allows a wireless device 440 to determine and display the various properties 710 of the wireless devices 410, 420, 430 located around it. Third, the present invention may be used to support wireless device applications such as the following: (a) determining the location of local printers and sending a file to them to be printed; (b) determining the location of monitors and sending videos or pictures to them for display; (c) socializing or understanding the social situation of other users having wireless devices that are mapped locally (e.g., in a bar, in a conference, in a restaurant, in a business meeting, etc); and, (d) sending a message or file to a user having a wireless device that is mapped locally. Fourth, the present invention allows the location of wireless devices to be locally determined using RFID methods in conjunction with wide area or global location services including GPS-based or WiFi-based methods.

Aspects of the above described method may be summarized with the aid of a flowchart.

Figure 12:
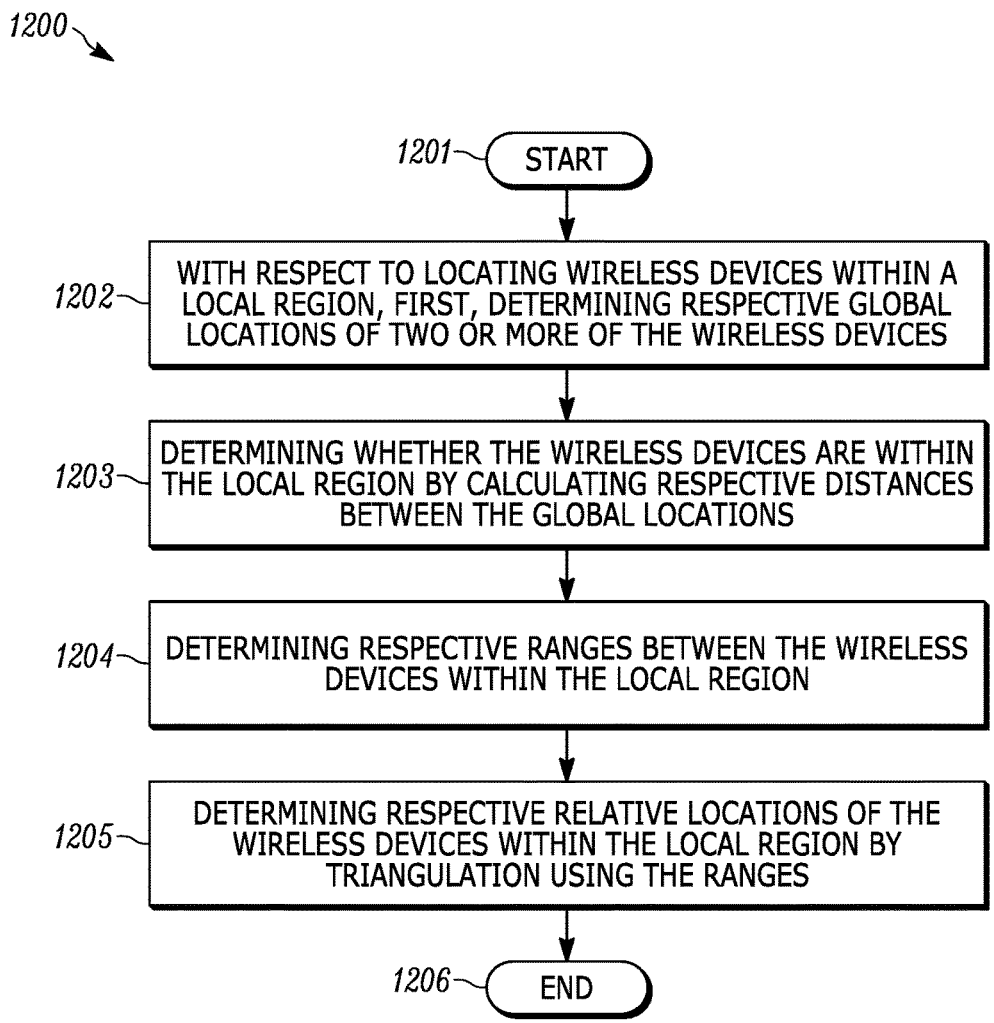

FIG. 12 is a flow chart illustrating operations 1200 of modules (e.g., software or hardware modules 331, 321) within a data processing system (e.g., 300, 407, 440) for locating wireless devices (e.g., 410, 420, 430, 440) within a local region 401, in accordance with an embodiment of the invention.

At step 1201, the operations 1200 start.

At step 1202, respective global locations 441 of two or more of the wireless devices 410, 420, 430, 440 are determined.

At step 1203, a determination is made as to whether the wireless devices 410, 420, 430, 440 are within the local region 401 by calculating respective distances (e.g., (x1, y1)-(x2, y2), etc.) between the global locations 441.

At step 1204, respective ranges 443 between the wireless devices 410, 420, 430, 440 within the local region 401 are determined.

At step 1205, respective relative locations 444 of the wireless devices 410, 420, 430, 440 within the local region 401 are determined by triangulation using the ranges 443.

At step 1206, the operations 1200 end.

In the above method, the step 1204 of determining the respective ranges 443 between the wireless devices 410, 420, 430, 440 within the local region 401 may include: transmitting respective original signals (e.g., 210) from the wireless devices 410, 420, 430, 440; in response to the respective original signals 210, receiving respective modulated signals (e.g., 220) at ones of the wireless devices (e.g., 440) from others of the wireless devices (e.g, 410, 420, 430), the modulated signals 220 being backscattered from the others of the wireless devices 410, 420, 430, the modulated signals 220 being frequency offset versions of the original signals 210; and, determining the ranges 443 between the wireless devices 410, 420, 430, 440 from the modulated signals 220. The method may further include measuring respective powers of the modulated signals 220, the powers of the modulated signals 220 being inversely proportional to the ranges 443 between the respective wireless devices 410, 420, 430, 440 to the fourth power. The respective original signals 210 may be transmitted sequentially from the wireless devices 410, 420, 430, 440. The ranges 443 may be determined by respective radio frequency identification systems (e.g., 100) included in the wireless devices 410, 420, 430, 440. The global locations 441 may be determined using respective global positioning system receivers (e.g., 321) included in the wireless devices 410, 420, 430, 440. The respective original signals 210 may be respective original radar signals and the respective modulated signals 220 may be respective modulated radar signals. The ranges 443 may be distances between the respective wireless devices 410, 420, 430, 440. The method may further include storing the relative locations 444 in a memory 330 of at least one of the wireless devices 410, 420, 430, 440. And, the method may further include presenting the relative locations 444 on a display 340 of at least one of the wireless devices 410, 420, 430, 440.

According to one embodiment, each of the above steps 1201-1206 may be implemented by a respective software module 331. According to another embodiment, each of the above steps 1201-1206 may be implemented by a respective hardware module 321. According to another embodiment, each of the above steps 1201-1206 may be implemented by a combination of software 331 and hardware modules 321. For example, FIG. 12 may represent a block diagram illustrating the interconnection of specific hardware modules 1201-1206 (collectively 321) within a data processing system 300, each hardware module 1201-1206 adapted or configured to implement a respective step of the method of the invention.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or product including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 may be contained in a data carrier product according to one embodiment of the invention. This data carrier product may be loaded into and run by the data processing system 300. In addition, the sequences of instructions which when executed cause the method described herein to be performed by the data processing system 300 may be contained in a computer program product or software product (e.g., comprising a non-transitory medium) according to one embodiment of the invention. This computer program or software product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the invention. This integrated circuit product may be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method, comprising:
    receiving Global Positioning System (GPS) data describing global locations for a plurality of wireless devices;
    identifying a set of local wireless devices from the plurality of wireless devices, the set of local wireless devices being within a local region determined according to the GPS data;
    transmitting, to each wireless device within the set of local wireless devices, a message to perform RFID range finding, wherein RFID range finding comprises:
        selecting a plurality of wireless devices within the set of local wireless devices;
        sending, by each wireless device within the selected plurality of wireless devices, an original signal to all other wireless devices within the set of local wireless devices;
        receiving, by the respective wireless device within the selected plurality of wireless devices, a range finding measurement from each of the other wireless devices within the set of local wireless devices, wherein each range finding measurement is a backscattered modulated signal;
    determining a respective relative location of each wireless device within the set of local wireless devices based on a plurality of range finding measurements; and
    transmitting, to each wireless device within the set of local wireless devices, the respective relative location of each wireless device within the set of local wireless devices.

2. The method of claim 1 wherein determining the respective relative location of each wireless device within the set of local wireless devices based on the plurality of range finding measurements comprises:
    transmitting respective original signals from each wireless device within the set of local wireless devices;
    responsive to the respective original signals, receiving respective modulated signals at a first local wireless device from other local wireless devices, the modulated signals being backscattered from the other local wireless devices, the modulated signals being frequency offset versions of the original signals; and,
    determining, from the modulated signals, the ranges between each wireless device within the set of wireless devices.

3. The method of claim 2 and further comprising measuring respective powers of the modulated signals, the powers of the modulated signals being inversely proportional to the ranges between the respective wireless devices to the fourth power.

4. The method of claim 2 wherein the respective original signals are transmitted sequentially from the wireless devices.

5. The method of claim 1 wherein the plurality of range finding measurements are determined by respective radio frequency identification systems included in the wireless devices.

6. The method of claim 1 wherein the GPS location data are determined using respective global positioning system receivers included in the wireless devices.

7. The method of claim 2 wherein the respective original signals are respective original radar signals and wherein the respective modulated signals are respective modulated radar signals.

8. The method of claim 1 and further comprising storing the relative locations in the memory of at least one of the wireless devices.

9. The method of claim 1 and further comprising presenting the relative locations on a display of at least one of the wireless devices.

10. A system, comprising:
a processor coupled to memory, a transmitter, and a receiver; and,
a non-transitory computer-readable medium storing instructions that are operative, when executed on the processor, to perform the functions of:
receiving Global Position System (GPS) data describing global locations for a plurality of wireless devices;
identifying a set of local wireless devices from the plurality of wireless devices, the set of local wireless devices being within a local region determined according to the GPS data;
transmitting, to each wireless device within the set of local wireless devices, a message to perform RFID range finding, wherein RFID range finding comprises:
selecting a plurality of wireless devices within the set of local wireless devices;
sending, by each wireless device within the selected plurality of wireless devices, an original signal to all other wireless devices within the set of local wireless devices;
receiving, by the respective wireless device within the selected plurality of wireless devices, a range finding measurement from each of the other wireless devices within the set of local wireless devices, wherein each range finding measurement is a backscattered modulated signal;
determining a respective relative location of each wireless device within the set of local wireless devices based on a plurality of range finding measurements; and
transmitting, to each wireless device within the set of local wireless devices, the respective relative location of each wireless device within the set of local wireless devices.

11. The system of claim 10 wherein determining the respective relative location of each wireless device within the set of local wireless devices based on the plurality of range finding measurements comprises:
controlling the transmitter to transmit an original signal from the system;
controlling the receiver to, in response to the original signal, receive respective modulated signals at the system from the local wireless devices, the modulated signals being backscattered from the local wireless devices, the modulated signals being frequency offset versions of the original signal; and,
determining, from the modulated signals, the ranges between each wireless device within the set of wireless devices.

12. The system of claim 11 and further comprising measuring respective powers of the modulated signals, the powers of the modulated signals being inversely proportional to the ranges between the respective wireless devices and the system to the fourth power.

13. The system of claim 11 wherein the respective original signals are transmitted sequentially from the system.

14. The system of claim 10 wherein the plurality of range finding measurements are determined by a radio frequency identification system included in the system.

15. The system of claim 10 wherein the GPS location data are determined using respective global positioning system receivers included in the wireless devices and in the system.

16. The system of claim 11 wherein the respective original signals are respective original radar signals and wherein the respective modulated signals are respective modulated radar signals.

17. The system of claim 10 and further comprising storing the relative locations in the memory of the system.

18. The system of claim 10 and further comprising presenting the relative locations on a display of the system.

* * * * *